(12) United States Patent
Du et al.

(10) Patent No.: US 10,935,157 B2
(45) Date of Patent: Mar. 2, 2021

(54) LOW PROFILE FAUCET HANDLE ASSEMBLY FOR A ROMAN TUB

(71) Applicant: Masco Canada Limited, St. Thomas (CA)

(72) Inventors: Xan Vy Du, London (CA); Bryan Fisher, Appin (CA)

(73) Assignee: Masco Canada Limited, St. Thomas (CA)

(*) Notice: Subject to any disclaimer, the term of this patent is extended or adjusted under 35 U.S.C. 154(b) by 0 days.

(21) Appl. No.: 16/015,542

(22) Filed: Jun. 22, 2018

(65) Prior Publication Data

US 2019/0017624 A1 Jan. 17, 2019

Related U.S. Application Data

(60) Provisional application No. 62/531,404, filed on Jul. 12, 2017.

(51) Int. Cl.
| | |
|---|---|
| *E03C 1/04* | (2006.01) |
| *F16K 31/60* | (2006.01) |
| *F16K 11/074* | (2006.01) |
| *F16K 11/078* | (2006.01) |
| *F16K 11/00* | (2006.01) |

(52) U.S. Cl.
CPC .............. *F16K 31/602* (2013.01); *E03C 1/04* (2013.01); *E03C 1/0409* (2013.01); *E03C 1/0412* (2013.01); *F16K 11/0743* (2013.01); *F16K 31/605* (2013.01); *F16K 31/607* (2013.01); *E03C 2001/0415* (2013.01); *F16K 11/0782* (2013.01); *F16K 11/0785* (2013.01); *F16K 11/0787* (2013.01); *F16K 19/006* (2013.01); *Y10T 137/7668* (2015.04)

(58) Field of Classification Search
CPC .. F16K 31/605; F16K 31/607; F16K 11/0743; F16K 11/0782; F16K 11/0785; F16K 11/0787; F16K 19/006; E03C 1/04; E03C 1/0412; E03C 2001/0415; Y10T 137/7668; Y10T 137/86815
See application file for complete search history.

(56) References Cited

U.S. PATENT DOCUMENTS 3,533,436 A * 10/1970 Parkison ................. F16K 11/00
137/359
4,979,539 A * 12/1990 Rohr ..................... E03C 1/0403
137/454.6

(Continued)

*Primary Examiner* — Matthew W Jellett
*Assistant Examiner* — Christopher D Ballman
(74) *Attorney, Agent, or Firm* — Reising Ethington P.C.

(57) ABSTRACT

A faucet handle assembly for a Roman tub has a low profile and can be installed from above or below the tub deck. A valve body extends along a longitudinal axis and defines a cartridge cavity. A lower end defines water inlet and outlet passages and a threaded external surface. An upper end defines a threaded internal surface. A mixing cartridge with a rotatable stem and a cartridge spacer are carried in the cavity with the spacer axially between the cartridge and the inlet and outlet passages of the valve body. A fastener has a threaded external surface threaded to the threaded internal surface of the valve body upper end. An upper mounting ring has a hub disposed about the upper end of the valve body and a flange extending radially outwardly from the hub.

27 Claims, 4 Drawing Sheets

(56) References Cited

U.S. PATENT DOCUMENTS

| | | | |
|---|---|---|---|
| 5,331,997 A * | 7/1994 | Bosio | F16K 11/0787 137/270 |
| 5,340,018 A * | 8/1994 | MacDonald | G05D 23/1353 236/12.2 |
| 5,368,071 A * | 11/1994 | Hsieh | E03C 1/04 137/625.17 |
| 5,701,926 A * | 12/1997 | Luisi | E03C 1/04 137/218 |
| 6,073,972 A * | 6/2000 | Rivera | E03C 1/04 137/801 |
| 6,154,897 A * | 12/2000 | Paini | E03C 1/04 137/218 |
| 6,237,622 B1 * | 5/2001 | Cook | F16K 11/074 137/270 |
| 6,557,770 B2 * | 5/2003 | Mace | F16K 11/0743 137/625.41 |
| 6,757,921 B2 * | 7/2004 | Esche | E03C 1/04 137/625.4 |
| 6,880,565 B2 * | 4/2005 | Ouyoung | E03C 1/0408 137/100 |
| 7,134,451 B1 * | 11/2006 | Malapanes | F16K 11/076 137/625.4 |
| 7,175,158 B2 | 2/2007 | Thomas | |
| 7,766,043 B2 * | 8/2010 | Thomas | E03C 1/04 137/801 |
| 7,802,733 B2 * | 9/2010 | Schmitt | G05D 23/1393 137/597 |
| 7,896,025 B2 | 3/2011 | Hanson | |
| 7,905,424 B2 * | 3/2011 | Li | F16K 11/0743 137/625.4 |
| 7,967,027 B2 | 6/2011 | Breda | |
| 8,185,984 B2 | 5/2012 | Meehan et al. | |
| 8,191,567 B2 | 6/2012 | Lorch | |
| 8,240,326 B2 * | 8/2012 | Kacik | E03C 1/04 137/315.12 |
| 8,375,990 B2 * | 2/2013 | Veros | F16K 11/0743 137/625.4 |
| 8,453,669 B2 * | 6/2013 | Veros | E03C 1/04 137/315.13 |
| 8,505,579 B2 * | 8/2013 | Esche | E03C 1/023 137/625.4 |
| 8,556,106 B1 * | 10/2013 | Bayat | B65D 43/0229 220/254.8 |
| 8,567,429 B2 * | 10/2013 | Lin | F16K 11/0743 137/315.11 |
| 8,584,697 B2 * | 11/2013 | Hsu | F16K 19/006 137/315.12 |
| 8,925,572 B2 * | 1/2015 | Shih | E03C 1/04 137/315.12 |
| 8,991,425 B2 * | 3/2015 | DeVries | E03C 1/04 137/625.4 |
| 9,145,665 B2 | 9/2015 | Bors et al. | |
| 9,611,945 B2 * | 4/2017 | Kemp | F16K 19/006 |
| 9,879,658 B2 * | 1/2018 | Graves | F03G 7/065 |
| 9,995,024 B2 * | 6/2018 | Nikles | E03C 1/0404 |
| 10,006,190 B1 * | 6/2018 | Johnson | E03C 1/04 |
| 2006/0289343 A1 * | 12/2006 | Schmitt | C02F 9/005 210/85 |
| 2009/0000026 A1 * | 1/2009 | Hanson | E03C 1/04 4/695 |
| 2009/0277520 A1 * | 11/2009 | Wang | E03C 1/0401 137/801 |
| 2016/0179108 A1 | 6/2016 | Fisher et al. | |
| 2017/0016216 A1 | 1/2017 | Crowe et al. | |

\* cited by examiner

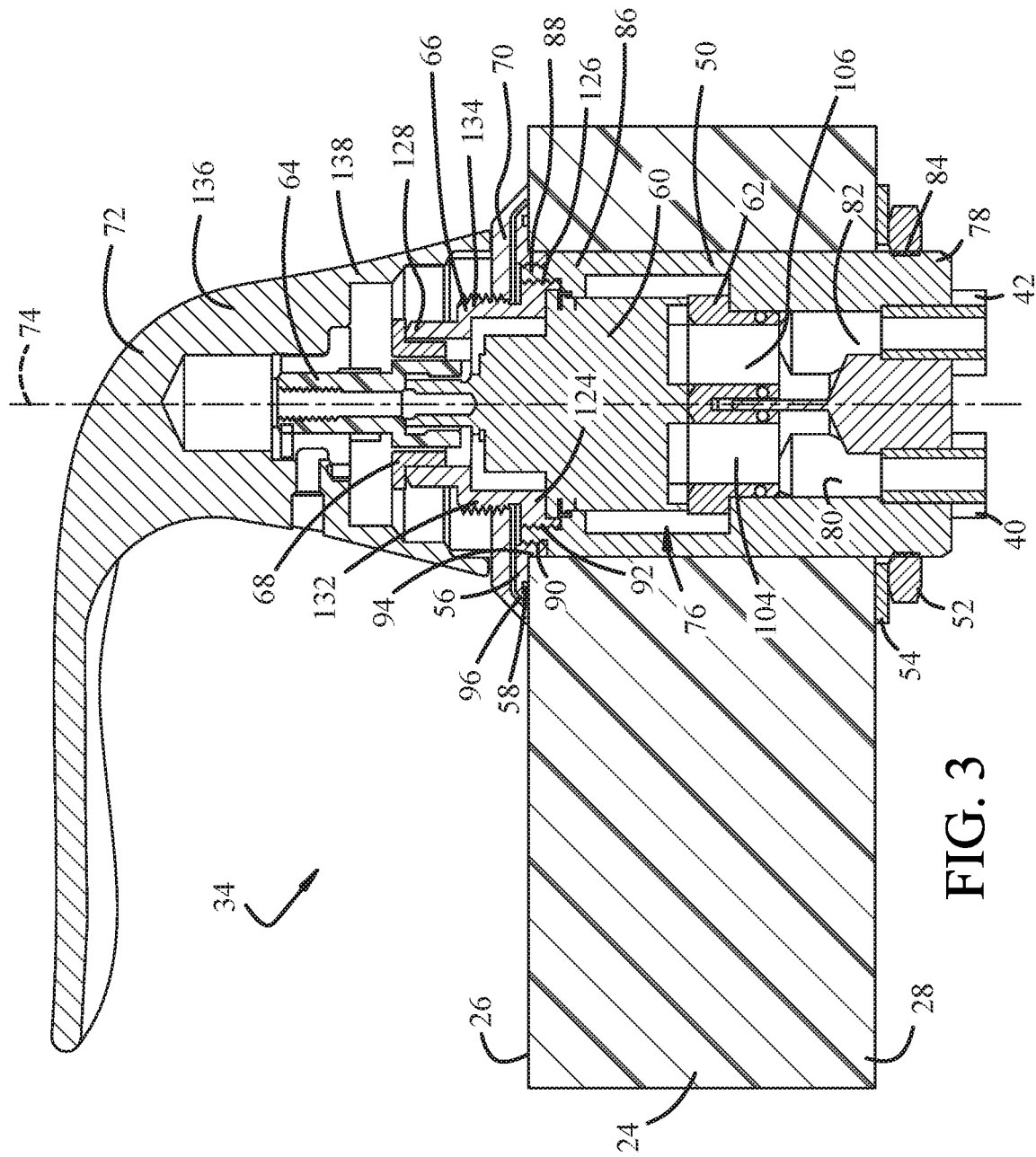

LOW PROFILE FAUCET HANDLE ASSEMBLY FOR A ROMAN TUB

BACKGROUND a. Field

This disclosure relates generally to faucet handle assemblies used in Roman tubs to turn the flow of fluids directed to spouts and handshowers on and off and control the temperature of the fluids. More specifically, this disclosure pertains to a handle assembly that has a relatively low profile and that is capable of installation from either above or below the deck of the tub.

b. Background Art

In a Roman tub, the water spout and other water outlets as well as the handles used to turn the flow of fluids directed to spouts and other water outlets on and off and control the temperature of the fluids are located on a deck of the tub as opposed to a nearby wall. Conventional handle assemblies for Roman tubs must be installed from above the deck and include valve bodies that are disposed substantially above the deck. As a result, the assemblies include handles with relatively high profiles that are aesthetically unpleasing and that can interfere with entry and exit to the tub. Further, tubs must generally include access panels to facilitate service of the assemblies below the deck.

The inventors herein have recognized a need for a faucet handle assembly that will overcome one or more of the above-identified deficiencies.

BRIEF SUMMARY

A faucet handle assembly for a Roman tub is provided. In particular, a handle assembly is provided that has a relatively low profile and is capable of installation from either above or below the deck of the tub.

A faucet handle assembly in accordance with one embodiment includes a valve body extending along a longitudinal axis and defining a cartridge cavity. The valve body includes a lower end with water inlet passages and a water outlet passage and a threaded external surface and an upper end with a threaded internal surface. The assembly further includes a mixing cartridge carried in the cartridge cavity of the valve body and having a rotatable stem. The assembly further includes a cartridge spacer carried in the cartridge cavity axially between the cartridge and the water inlet and outlet passages of the valve body. The assembly further includes a fastener having a threaded external surface with a portion threaded to the threaded internal surface of the upper end of the valve body. The assembly further includes an upper mounting ring having a hub disposed about the upper end of the valve body and a flange extending radially outwardly from the hub.

A faucet handle assembly in accordance with another embodiment includes a valve body extending along a longitudinal axis and defining a cartridge cavity. The valve body includes a lower end with water inlet passages and a water outlet passage and a threaded external surface and an upper end with a threaded external surface and a threaded internal surface. The assembly further includes a mixing cartridge carried in the cartridge cavity of the valve body. The mixing cartridge includes a lower end having water inlet passages and a water outlet passage and an upper end having a rotatable stem. The assembly further includes a cartridge spacer carried in the cartridge cavity axially between the cartridge and the water inlet and outlet passages of the valve body and including inlet passages in fluid communication with the water inlet passages in the valve body and the water inlet passages in the mixing cartridge. The assembly further includes a fastener open at each end and having a threaded external surface with a portion threaded to the threaded internal surface of the upper end of the valve body. The assembly further includes an upper mounting ring having an internally threaded hub threaded to the threaded external surface of the upper end of the valve body and a flange extending radially outwardly from the hub.

The foregoing and other aspects, features, details, utilities, and advantages of the disclosed embodiments will be apparent from reading the following description and claims, and from reviewing the accompanying drawings.

BRIEF DESCRIPTION OF THE DRAWINGS

FIG. 3 is a cross-sectional view of the faucet handle assembly of FIG. 1.

DETAILED DESCRIPTION

Figure 1:
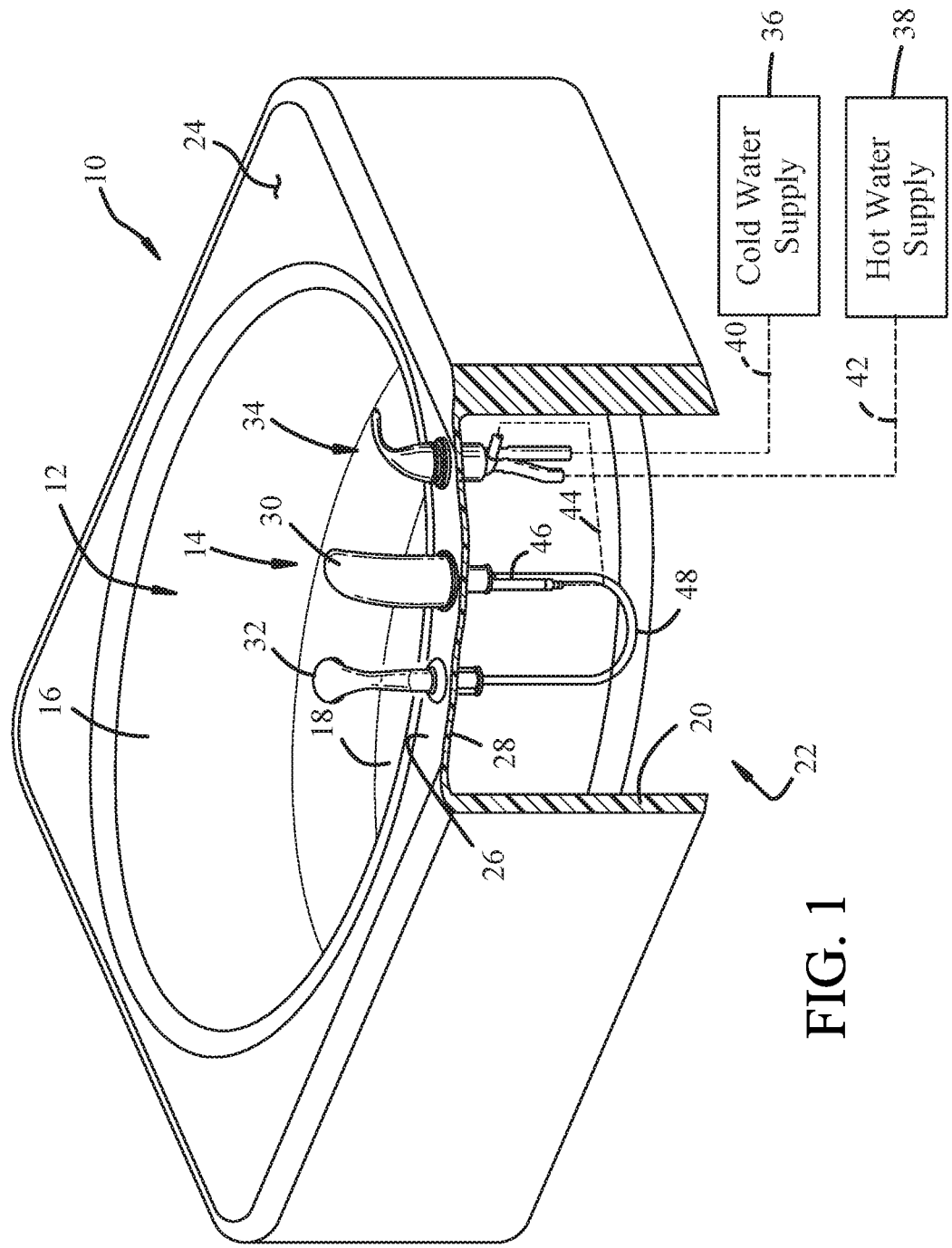
FIG. 1 is a partially cut-away perspective view of a Roman tub incorporating a faucet system with one embodiment of a faucet handle assembly.

Referring now to the drawings wherein like reference numerals are used to identify identical components in the various views, FIG. 1 illustrates a Roman tub 10 for use in bathing. Roman tub 10 includes a tub 12 and a faucet system 14. Tub 12 includes an inner wall 16 that defines a basin 18 configured to contain water and one or more persons or other objects. Tub 12 further includes an outer wall 20 that is spaced from the inner wall 16 to define an interior space 22. A portion of outer wall 20 has been removed in FIG. 1 to illustrate components of Roman tub 10 that disposed within space 22. Tub 12 further includes a generally horizontal mounting deck 24 that extends between walls 16, 20 and forms a perimeter rim for basin 18. Deck 24 includes a plurality of mounting passages that extending from an upper surface 26 of deck 24 to a lower surface 28 of deck 24 and communicate with space 22. These passages are configured to received components of faucet system 14.

Faucet system 14 is provided to control fluid flow into basin 18 of tub 12. System 14 comprises a three-part Roman tub faucet system and, in accordance with certain aspects of the teachings disclosed herein, comprises a lower-profile, flush-mount system. In the illustrated embodiment, system 14 includes a faucet spout assembly 30, a faucet handshower assembly 32 and a faucet handle assembly 34 in accordance with one embodiment of the present teachings. Assemblies 30, 32, 34 extend through corresponding mounting passages in deck 24 with portions of assemblies 30, 32, 34 located above deck 24 and other portions located below deck 24. System 14 is fluidly coupled to cold and hot water supplies 36, 38 through fluid conduits 40, 42. Conduits 40, 42 are coupled to handle assembly 34 which outputs a mixture of cold and hot water to another fluid conduit 44. Conduit 44 transfers fluid to a diverter valve 46 which in turn directs fluid to either spout assembly 30 or to handshower assembly 32 (through a conduit 48). In particular, handshower assembly 32 may include an actuator (not shown) that may be actuated directly by the user or indirectly by the user (e.g., by movement of assembly 32) and cause diverter valve 46 to direct fluid to handshower assembly 32. When the actuator is not actuated, diverter valve 46 directs fluid to spout assembly 30.

Figure 2:
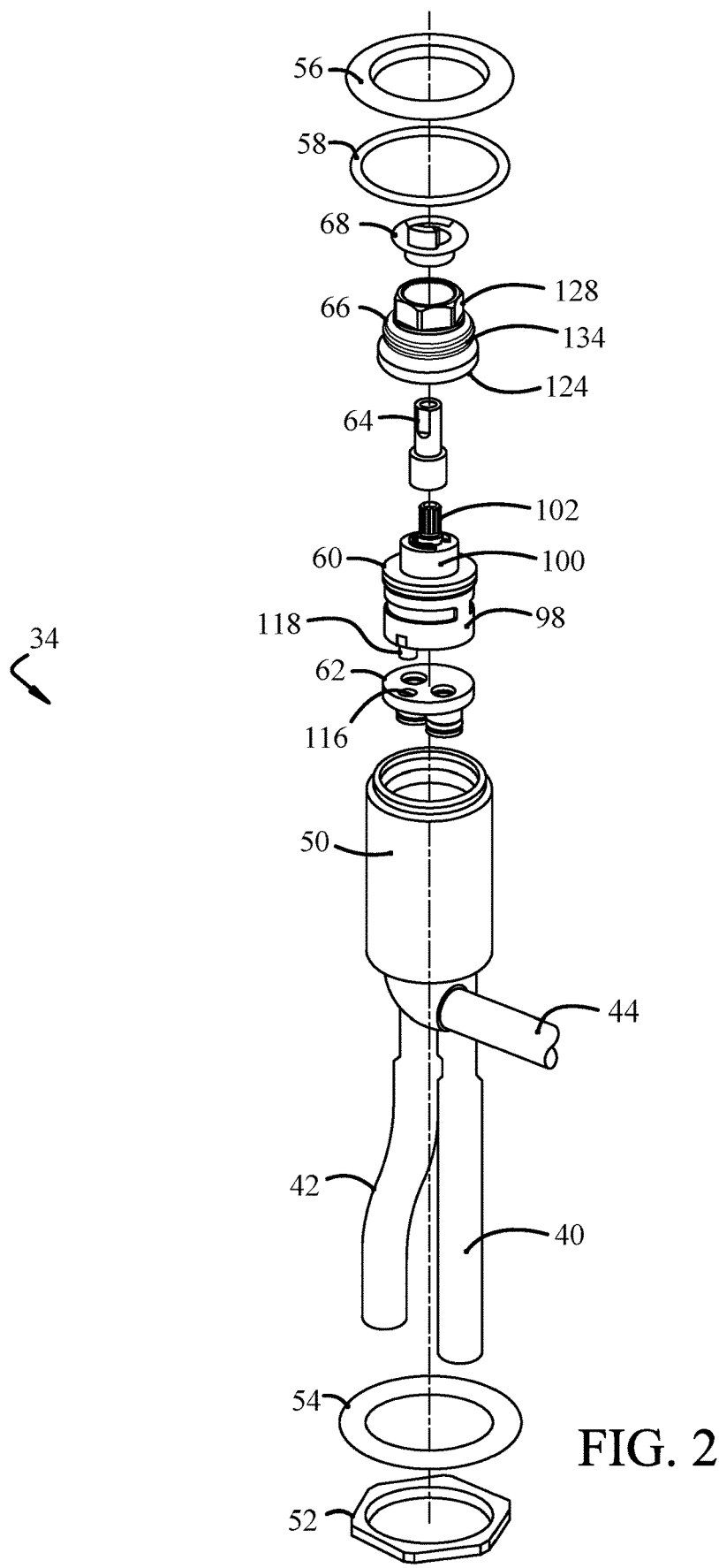
FIG. 2 is an exploded, perspective view of the faucet handle assembly of FIG. 1.

Referring now to FIGS. 2-3, one embodiment of a handle assembly 34 of faucet system 14 in accordance with the present teachings is shown. Handle assembly 34 is provided to turn the flow of fluids directed to spout assembly 30 or handshower assembly 32 on and off and control the temperature of the fluids. Handle assembly 34 may include a valve body 50, a lower mounting ring 52 and washer 54, an upper mounting ring 56 and seal 58, a mixing cartridge 60, a cartridge spacer 62, a stem extender 64, a fastener 66, a hot limit stop ring 68, and, as shown in FIG. 3, an escutcheon 70 and a handle 72.

Valve body 50 houses mixing cartridge 60 and cartridge spacer 62 and serves as a connection point for fluid conduits 40, 42, 44. Valve body 50 protects cartridge 60 and spacer 62 from foreign objects and elements and supports and orients cartridge 60 and spacer 62. Body 50 is configured to be received within a mounting passage within deck 24. In accordance with aspects of the present teachings, body 50 is configured to locate mixing cartridge 60 substantially below upper surface 26 of deck 24 to establish a relatively low profile for handle assembly 34 above deck 24. Valve body 50 is further configured to allow insertion of valve body 50 (and the assembly of components including mixing cartridge 60, spacer 62, stem extender 64, fastener 66 and stop ring 68) into the mounting passage in deck 24 either from above deck 24 or below deck 24. Valve body 50 is substantially cylindrical in shape and extends along a longitudinal axis 74. Valve body 50 defines a cartridge cavity 76 configured to receive mixing cartridge 60 and spacer 62. A lower end 78 of valve body 50 (i.e. the longitudinal end of valve body 50 configured to be located nearer to lower surface 28 of deck 24 than upper surface 26 of deck 24 after assembly), includes a pair of water inlet passages 80, 82 and an outlet passage (not shown) configured to receive one end of conduits 40, 42, 44. Body 50 may be made from brass and copper connectors at an end of each conduit 40, 42, 44 may be soldered to body 50 to create a water tight connection. End 78 further defines a threaded external surface 84. Referring to FIG. 3, surface 84 is disposed intermediate the longitudinal end surfaces of valve body 50 and is configured to be located below lower deck surface 28 in deck 24 after insertion into the mounting passage in deck 24. An upper end 86 of valve body 50 (i.e., the longitudinal end of valve body 50 configured to be located nearer to upper surface 26 of deck 24 than lower surface 28 of deck 24 after assembly) includes a reduced diameter end flange 88 that defines a threaded external surface 90 and a threaded internal surface 92. Portions of surfaces 90, 92 may be radially aligned. Flange 88 has a diameter that is less than the diameter of the mounting passage through deck 24 (such that the radially outer surface 90 is spaced from the radially inner surface of deck 24 defining the mounting passage). Referring to FIG. 3, in the illustrated embodiment, portions of each surface 90, 92 are disposed above and below upper surface 26 of deck 24 after assembly.

Lower mounting ring 52 and washer 54 are provided to secure the position of valve body 50 after insertion through deck 24 and prevent subsequent upward movement of valve body 50 along axis 74. Ring 52 defines an internal thread that may be threaded to surface 84 of lower end 78 of valve body 50. Washer 54 may be disposed about valve body 50 between lower surface 28 of deck 24 and ring 52. The outer diameter of ring 52 and washer 54 is greater than the diameter of the mounting passage through deck 24.

Upper mounting ring 56 is also provided to secure the position of valve body 50 after insertion through deck 24 and prevent subsequent downward movement of valve body 50 along axis 74. Ring 56 has a hub 94 that is sized to be received within the mounting passage of deck 24 and to locate hub 94 radially between end flange 88 of valve body 50 and the wall of the mounting passage. Hub 94 includes an internal thread that is configured to be threaded to the external threaded surface 90 of end flange 88 of valve body 50. In alternative embodiments, hub 94 may be coupled to valve body 50 using alternative fastening techniques including welds, adhesives and pins or may be integrated with valve body 50 such that valve body 50 and upper mounting ring 56 form a unitary (one-piece) structure. Ring 56 further includes a flange 96 that is located at one end of hub 94 and extends radially outwardly from hub 94. Flange 96 has a diameter that is greater than the diameter of the mounting passage such that flange 96 rests on upper surface 26 of deck 24 after assembly. Flange 96 may define a groove on a side facing upper surface 26 of deck 24 that is configured to accept seal 58 therein. Seal 58, which may comprise an O-ring seal, gasket or bead of sealant, is disposed between flange 96 of ring 56 and surface 26 of deck 24 and prevents fluids or other contaminants from passing through the mounting passage in deck 24.

Mixing cartridge 60 controls whether the flow of water is on or off from conduits 40, 42 to conduit 44 and the temperature of the water output through conduit 44 to spout assembly 30 or handshower assembly 32. Referring again to FIG. 2, cartridge 60 includes a lower end 98 having water inlet passages that are configured to receive hot and cold water from conduits 40, 42 and a water outlet passage that is configured to deliver a mixture of hot and cold water to conduit 44. Cartridge 60 includes an upper end 100 having a rotatable stem 102 configured to be coupled to handle 72. In accordance with one aspect of the present teachings, cartridge 60 may comprise a high-flow mixing cartridge and, in particular, may comprise a ceramic mixing cartridge (although it should be understood that cartridge 60 may assume other valve constructions including compression or spring/seat/plate constructions). The cartridge may include one stationary ceramic disc having openings configured to communicate with the water inlet and output passages in lower end 98 of valve body 50 and another movable ceramic disc that is coupled to stem 102 and handle 72 and has openings configured for varying degrees of alignment with the openings in the stationary ceramic disc upon movement of the handle 72 and stem 102. The movable disc rotates with handle 72 and stem 102 to control the temperature of water output to conduit 44. Cartridge 60 is configured to be received at least partially within cartridge cavity 76 in valve body 50 and to be carried within cavity 76. In accordance with one aspect of the present teachings, a predominant portion of the axial extent of cartridge 60 is carried below an upper surface of the valve body 50 contributing to the relatively low profile of handle assembly 34.

Figure 5:
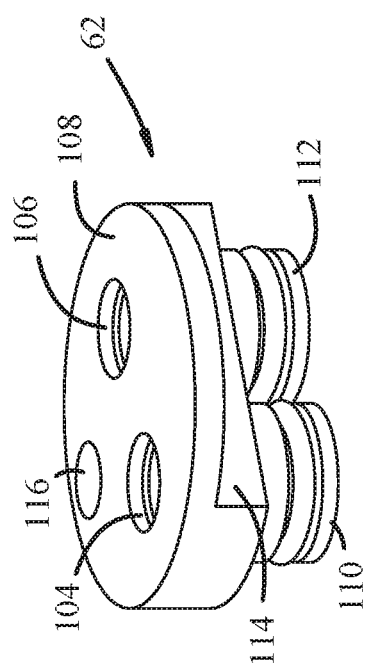
FIG. 5 is a perspective view of one embodiment of the cartridge spacer of the faucet handle assembly of FIG. 1.
Figure 6:
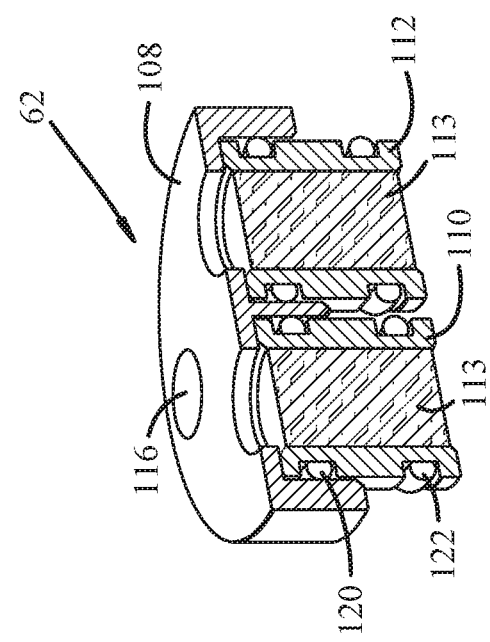
FIG. 6 is a cross-sectional view of the cartridge spacer of FIG. 5.
Figure 4:
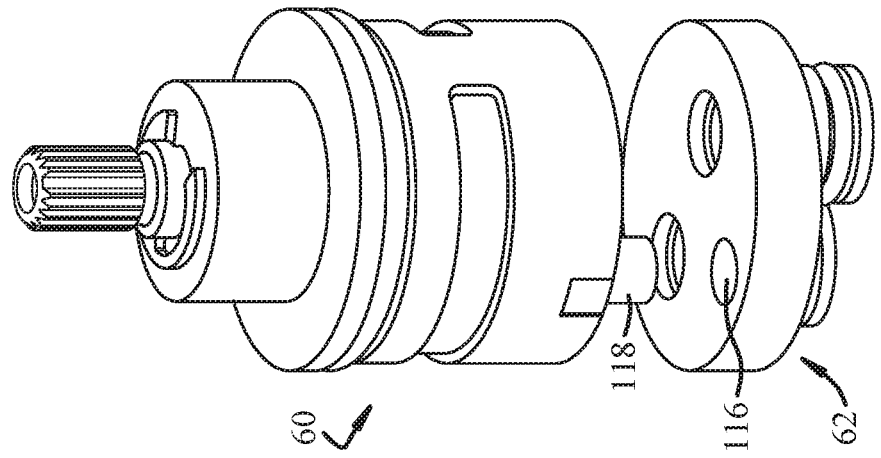
FIG. 4 is a perspective view of a mixing cartridge and cartridge spacer of the faucet handle assembly of FIG. 1.

Cartridge spacer 62 is provided to space mixing cartridge 60 from the bottom of cartridge cavity 76 and the inlet and outlet water passages in lower end 78 of valve body 50 and to facilitate a high flow rate of water output by handle assembly 34. The mixture of water formed in cartridge 60 is output through a radially outer surface of cartridge 60 in order to generate a high fluid flow rate through cartridge 60. The water then travels downward through cavity 76 between cartridge 60 and the radially inner walls of valve body 50 and is output from body 50 through an outlet passage to conduit 44. To facilitate a low-profile design, the outlet passage is formed in the bottom wall of valve body 50 parallel to inlet passages 80, 82. Spacer 62 facilitates a high flow rate through the outlet passage by establishing a large area connecting the flow area between cartridge 60 and the internal wall of valve body 50 and the outlet passage in valve body 50. Although cartridge 60 and spacer 62 are separate structures in the illustrated embodiment, it should be understood that cartridge 60 and spacer 62 could alternatively be formed as a unitary (one-piece) body. Referring again to FIG. 3, spacer 62 is carried in cartridge cavity 76 axially between mixing cartridge 60 and the water inlet and outlet passages 80, 82 in valve body 50. Spacer 62 includes inlet passages 104, 106 in fluid communication with water inlet passages 80, 82 in valve body 50 and the water inlet passages in mixing cartridge 60. Referring to FIGS. 4-6, in one embodiment spacer 62 may include a plate 108 and a plurality of fluid stems 110, 112 (it should be understood, however, that plate 108 and stems 110, 112 may alternatively be formed as a unitary (one-piece) body). Plate 108 includes fluid passages 104, 106 that are aligned with inlet passages 80, 82 in valve body 50 upon installation of spacer 62 within cavity 76 of valve body 50. Plate 108 also defines an area 114 connecting the flow area between cartridge 60 and the internal wall of valve body 50 and the outlet passage in valve body 50 as described above. Plate 108 may further include an orientation feature 116 that prevents improper installation of the mixing cartridge 60 by positioning mixing cartridge 60 within valve body 50. In the illustrated embodiment, feature 116 comprises a recess within plate 108 configured to receive an axially extending projection 118 from cartridge 60. Fluid stems 110, 112 are annular in shape and define fluid conduits between the inlet passages 80, 82 in valve body 50 and the fluid inlet passages 104, 106 in plate 108. Stems 110, 112 may each define a pair of axially spaced grooves configured to receive seals 120, 122 (such as O-ring seals) used to seal the connections between stems 110, 112 and plate 108 and valve body 50, respectively. It should be understood, however, that other types of seals may be used between stems 110, 112 and plate 108 and/or valve body 50 including face seals. Stems 110, 112 may further include filters 113 disposed within the fluid conduits. Alternatively, or in addition, filters 113 may also be located within inlet passages 104, 106 in plate 108. By locating filters 113 in spacer 62, filters 113 may be replaced independent of cartridge 60 and may be replaced from above deck 24.

Referring again to FIG. 2, stem extender 64 is provided to increase the effective length of stem 102 in mixing cartridge 60. Extender 64 defines an opening a lower longitudinal end configured to receive stem 102 therein and is coupled to stem 102 for rotation therewith. It should be understood, however, that stem 102 and extender 64 may be formed as a unitary (one-piece) part in mixing cartridge 60. Referring to FIG. 3, an upper longitudinal end of stem extender 64 is configured for coupling to handle 72.

Figure 7:
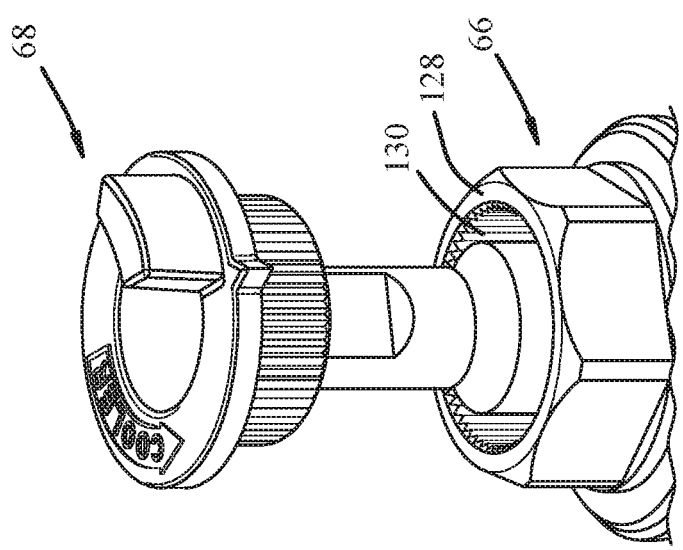
FIG. 7 is an exploded perspective view of a stem extender, fastener and a hot limit stop ring of the faucet handle assembly of FIG. 1.

Fastener 66 is provided to secure mixing cartridge 60 within valve body 50. Fastener 66 may also be used to set a temperature or hot limit stop by locating stop ring 68. Fastener 66 is separate from upper mounting ring 56 to facilitate service of assembly 34 from above deck 24 after installation of assembly 34. Fastener 66 may comprise a bonnet nut that is open at each longitudinal end. A lower longitudinal end may be configured to receive a portion of mixing cartridge 60 therein. An upper longitudinal end may be configured to receive portions of stem 102 of mixing cartridge 60, stem extender 64 and hot limit stop ring 68. Fastener 66 may have an outer diameter that varies along the length of fastener 66. A lower end portion 124 of fastener 66 may have the largest outer diameter and is configured to engage the radially inner surface of end flange 88 of valve body 50. In particular, portion 124 may have a threaded external surface 126 that is threaded to the threaded internal surface 92 of end flange 88 of the upper end 86 of valve body 50. An upper end portion 128 of fastener 66 may have the smallest outer diameter and is configured to be received within handle 72. Referring to FIG. 7, upper end portion 128 may include an internal broach feature 130 formed in the radially inner surface of portion 128 that is configured to locate hot limit stop ring 68. Feature 130 may, for example, comprise a plurality of axially extending splines configured to engage mating splines on hot limit stop ring 68. Referring again to FIG. 3, an intermediate portion 132 between portions 124, 128 may have an outer diameter that is greater than the outer diameter of upper end portion 128, but less than the outer diameter of lower end portion 124. Intermediate portion 132 may have a threaded external surface 134 for a purpose described below.

Hot limit stop ring 68 is provided to limit the amount of hot water from conduit 42 that may enter mixing cartridge 60 and, ultimately, be directed to conduit 44 and spout assembly 30 or handshower assembly 32. Ring 68 is annular in shape and is configured to be received within and carried in the opening in upper end portion 128 of fastener 66 radially between stem extender 64 and the radially inner surface of fastener 66. Referring again to FIG. 7, ring 68 has a shape on a radially outer surface that is complementary to the shape of the radially inner surface of fastener 66 and, in particular, to the internal broach feature 130 in fastener 66 in order to position ring 68 within upper end portion 128 of fastener 66. Ring 68 limits the degree of rotation of handle 72, stem extender 64 and stem 102, and therefore, the alignment between fluid passages within mixing cartridge 60 to limit the amount of hot water that may be output by cartridge 60.

Escutcheon 70 provides a surface to support handle 72 for relative rotation and a decorative cover for upper mounting ring 56. An external surface of escutcheon 70 may be conical in shape. An inner surface of escutcheon 70 defines an internal thread configured to engage an external thread 134 on intermediate portion 132 of fastener 66. Escutcheon 70 is sized to cover and hide upper mounting ring 56.

Handle 72 provides an interface for a user to control the flow of water and temperature of water exiting spout assembly 30 or handshower assembly 32. Handle 72 has a body 136 that is configured to receive stem extender 64 therein and may be coupled to stem extender 64 using a set screw or another fastener. Body 136 may further be configured to receive stop ring 68 as well as the upper portions 128, 100 of fastener 66 and mixing cartridge 60, respectively. Handle 72 further includes a skirt 138 depending from body 136. Skirt 138 is configured to rest on escutcheon 70 and hides fastener 66 and stem extender 64. Although a particular handle is shown in the illustrated embodiment, it should be understood that handle 72 may assume a variety of forms.

A faucet handle assembly 34 in accordance with the present teachings represents an improvement relative to conventional handle assemblies. The inventive handle assembly 34 has a structure that allows the valve body 50 and components supported by the valve body 50 such as mixing cartridge 60, spacer 62, fastener 66 and stem extender 64, to be installed and serviced from above or below deck 24 thereby eliminating the need for access panels in the tub 12. Further, by locating most components below or partially below the upper surface 26 of deck 24, assembly 34 has a relatively low profile that is aesthetically pleasing and reduces potential interference with entry and exit to the tub 12.

While the invention has been shown and described with reference to one or more particular embodiments thereof, it will be understood by those of skill in the art that various changes and modifications can be made without departing from the spirit and scope of the invention.

We claim:

1. A faucet handle assembly, comprising:
   a valve body extending along a longitudinal axis and defining a cartridge cavity, the valve body including a lower end with water inlet passages and a water outlet passage and a circular cylindrical threaded external surface and an upper end with a circular cylindrical threaded internal surface and a circular cylindrical threaded external surface;
   a mixing cartridge carried in the cartridge cavity of the valve body and having a rotatable stem;
   a cartridge spacer carried in the cartridge cavity axially between the cartridge and the water inlet and outlet passages of the valve body;
   a fastener having a circular cylindrical threaded external surface with a portion threaded to the circular cylindrical threaded internal surface of the upper end of the valve body; and
   an upper mounting ring having a hub disposed about the upper end of the valve body and having a circular cylindrical internal threaded surface threaded to the circular cylindrical threaded external surface of the upper end of the valve body, and a flange extending radially outwardly from the hub.

2. The faucet handle assembly of claim 1 wherein the upper end of the valve body has a reduced diameter end flange that defines the circular cylindrical threaded external surface and the circular cylindrical threaded internal surface.

3. The faucet handle assembly of claim 1 wherein the fastener is separate from the upper mounting ring.

4. The faucet handle assembly of claim 1, wherein the mixing cartridge is a high-flow mixing cartridge configured to control a flow of water and a temperature of the water.

5. The faucet handle assembly of claim 1, wherein the mixing cartridge has an axial extent and a predominant portion of the axial extent is carried below an upper surface of the valve body.

6. The faucet handle assembly of claim 1, wherein the cartridge spacer includes an orientation feature configured to position the mixing cartridge within the valve body.

7. The faucet handle assembly of claim 1 wherein the mixing cartridge and the cartridge spacer form a unitary body.

8. The faucet handle assembly of claim 1 wherein the cartridge spacer includes:
   a plate defining a plurality of fluid inlet passages aligned with the water inlet passages of the valve body; and,
   a plurality of fluid stems, each of the plurality of fluid stems defining a fluid conduit between one of the water inlet passages in the valve body and one of the plurality of fluid inlet passages in the plate and supporting a seal positioned between the fluid stem and at least one of the plate and the valve body.

9. The faucet handle assembly of claim 8 wherein the cartridge spacer includes a filter disposed in at least one of the fluid inlet passages defined by the plate and the fluid conduits defined by the plurality of fluid stems.

10. The faucet handle assembly of claim 1, further comprising a lower mounting ring having an internal thread threaded to the threaded external surface of the lower end of the valve body.

11. The faucet handle assembly of claim 1, wherein the upper mounting ring has an underside groove configured to accept a seal therein.

12. A low-profile, flush-mount, three-part, Roman tub faucet system comprising a spout assembly and a handshower assembly in fluid communication with the faucet handle assembly of claim 1.

13. A Roman tub, comprising a tub and the faucet handle assembly of claim 1, the tub having an inner wall defining a basin, an outer wall spaced from the inner wall and a deck extending between the inner and outer walls, the deck defining a handle assembly mounting passage wherein the valve body of the handle assembly is configured to be inserted into the mounting passage from above or below the deck.

14. A faucet handle assembly, comprising:
   a valve body extending along a longitudinal axis and defining a cartridge cavity, the valve body including a lower end with water inlet passages and a water outlet passage and a circular cylindrical threaded external surface and an upper end with a circular cylindrical threaded internal surface,
   a mixing cartridge carried in the cartridge cavity of the valve body and having a rotatable stem;
   a cartridge spacer carried in the cartridge cavity axially between the cartridge and the water inlet and outlet passages of the valve body;
   a fastener having a circular cylindrical threaded external surface with a portion threaded to the circular cylindrical threaded internal surface of the upper end of the valve body; and
   an upper mounting ring having a hub disposed about the upper end of the valve body and a flange extending radially outwardly from the hub; and
   a hot limit stop ring carried in an open upper end of the fastener, the hot limit stop having a shape on a radially outer surface complementary to a shape of a radially inner surface of the fastener.

15. A faucet handle assembly, comprising:
   a valve body extending along a longitudinal axis defining a cartridge cavity, the valve body including a lower end with water inlet passages and a water outlet passage and a circular cylindrical threaded external surface and an upper end with a circular cylindrical threaded internal surface;
   a mixing cartridge carried in the cartridge cavity of the valve body and having a rotatable stem;
   a cartridge spacer carried in the cartridge cavity axially between the cartridge and the water inlet and outlet passages of the valve body;
   a fastener having a circular cylindrical threaded external surface with a portion threaded to the circular cylindrical threaded internal surface of the upper end of the valve body; and an upper mounting ring having a hub disposed about the upper end of the valve body and a flange extending radially outwardly from the hub;

an internally threaded escutcheon threaded to another portion of the circular cylindrical threaded external surface of the fastener and hiding the upper mounting ring; and, a handle having a body coupled to the stem and a skirt depending from the body and hiding the fastener.

16. A faucet handle assembly, comprising:

a valve body extending along a longitudinal axis and defining a cartridge cavity, the valve body including a lower end with water inlet passages and a water outlet passage and a circular cylindrical threaded external surface and an upper end with a circular cylindrical threaded external surface and a circular cylindrical threaded internal surface, wherein the upper end of the valve body has a reduced diameter end flange that defines the circular cylindrical threaded external surface and the circular cylindrical threaded internal surface;

a mixing cartridge carried in the cartridge cavity of the valve body, the mixing cartridge including a lower end having water inlet passages and a water outlet passage and an upper end having a rotatable stem;

a cartridge spacer carried in the cartridge cavity axially between the cartridge and the water inlet and outlet passages of the valve body and including inlet passages in fluid communication with the water inlet passages in the valve body and the water inlet passages in the mixing cartridge;

a fastener open at each end and having a circular cylindrical threaded external surface with a portion threaded to the circular cylindrical threaded internal surface of the upper end of the valve body; and an upper mounting ring having an internally threaded hub threaded to the circular cylindrical threaded external surface of the upper end of the valve body, and a flange extending radially outwardly from the hub.

17. The faucet handle assembly of claim 16, wherein the mixing cartridge is a high-flow mixing cartridge configured to control a flow of water and a temperature of the water.

18. The faucet handle assembly of claim 16, wherein the mixing cartridge has an axial extent and a predominant portion of the axial extent is carried below an upper surface of the valve body.

19. The faucet handle assembly of claim 16, wherein the cartridge spacer includes an orientation feature configured to position the mixing cartridge within the valve body.

20. The faucet handle assembly of claim 16, further comprising a hot limit stop ring carried in the open upper end of the fastener, the hot limit stop having a shape on a radially outer surface complementary to a shape of a radially inner surface of the fastener.

21. The faucet handle assembly of claim 16, further comprising a lower mounting ring having an internal thread threaded to the circular cylindrical threaded external surface of the lower end of the valve body.

22. The faucet handle assembly of claim 16, further comprising:

an internally threaded escutcheon threaded to another portion of the circular cylindrical threaded external surface of the fastener and hiding the upper mounting ring; and, a handle having a body coupled to the stem and a skirt depending from the body and hiding the fastener.

23. The faucet handle assembly of claim 16, wherein the upper mounting ring has an underside groove configured to accept a seal therein.

24. A low-profile, flush-mount, three-part, Roman tub faucet system comprising a spout assembly and a handshower assembly in fluid communication with the faucet handle assembly of claim 16.

25. A Roman tub, comprising a tub and the faucet handle assembly of claim 16, the tub having an inner wall defining a basin, an outer wall spaced from the inner wall and a deck extending between the inner and outer walls, the deck defining a handle assembly mounting passage wherein the valve body of the handle assembly is configured to be inserted into the mounting passage from above or below the deck.

26. A faucet handle assembly, comprising:

a valve body extending along a longitudinal axis and defining a cartridge cavity, the valve body including a lower end with water inlet passages and a water outlet passage and a threaded external surface, and an upper end having a reduced diameter end flange that defines a threaded internal surface and a threaded external surface;

a mixing cartridge carried in the cartridge cavity of the valve body and having a rotatable stem;

a cartridge spacer carried in the cartridge cavity axially between the cartridge and the water inlet and outlet passages of the valve body;

a fastener having a threaded external surface with a portion threaded to the threaded internal surface of the upper end of the valve body; and an upper mounting ring having a hub disposed about the upper end of the valve body and a flange extending radially outwardly from the hub, wherein the hub has an internal threaded surface threaded to the threaded external surface of the upper end of the valve body.

27. The faucet handle assembly of claim 26 wherein the threaded internal surface of the upper end of the valve body and the threaded external surface of the upper end of the valve body are of circular cylindrical shape.

* * * * *